Oct. 27, 1970   J. MOLNAR   3,536,337
PNEUMATIC TRAILER STAND
Filed Oct. 22, 1968   2 Sheets-Sheet 1

INVENTOR.
Joseph Molnar

Oct. 27, 1970

J. MOLNAR 3,536,337

PNEUMATIC TRAILER STAND

Filed Oct. 22, 1968

INVENTOR.
Joseph Molnar

3,536,337
PNEUMATIC TRAILER STAND
Joseph Molnar, 1111 Roselawn Drive,
Windsor, Ontario, Canada
Filed Oct. 22, 1968, Ser. No. 769,637
Int. Cl. B60s 9/02
U.S. Cl. 280—150.5        2 Claims

ABSTRACT OF THE DISCLOSURE

A device for replacing the conventional dollies on trailer-semis. This device is structurally superior to the manually operated dollies and is raised and lowered by a pneumatically operated cylinder powered by the air pressure from the trailer's own reservoir. The device also has provision for ground floation by the use of flat pads which minimizes the danger of sinking into soft earth, and the nature of the structure will automatically lock the legs when the legs are lowered and unlock the legs when the air cylinder is activated to raise the legs.

---

This invention relates to trailer stand devices and more particularly to a pneumatic trailer stand.

It is therefore the main purpose of this invention to provide a pneumatic trailer stand which will safely and effectively raise and lower by air which will be supplied by the trailer's reservoir.

Another object of this invention is to provide a pneumatic trailer stand which will be more efficient and quick in operation than the structures of the prior art.

A further object of this invention is to provide a pneumatic trailer stand which will require less maintenance than manually operated conventional structures.

Other objects of this invention are to provide a pneumatic trailer stand which is simple in design, inexpensive to manufacture, rugged in construction, easy to use and efficient in operation.

These and other objects will become readily apparent upon a study of the following specification together with the accompanying drawing wherein.

Figure 1:
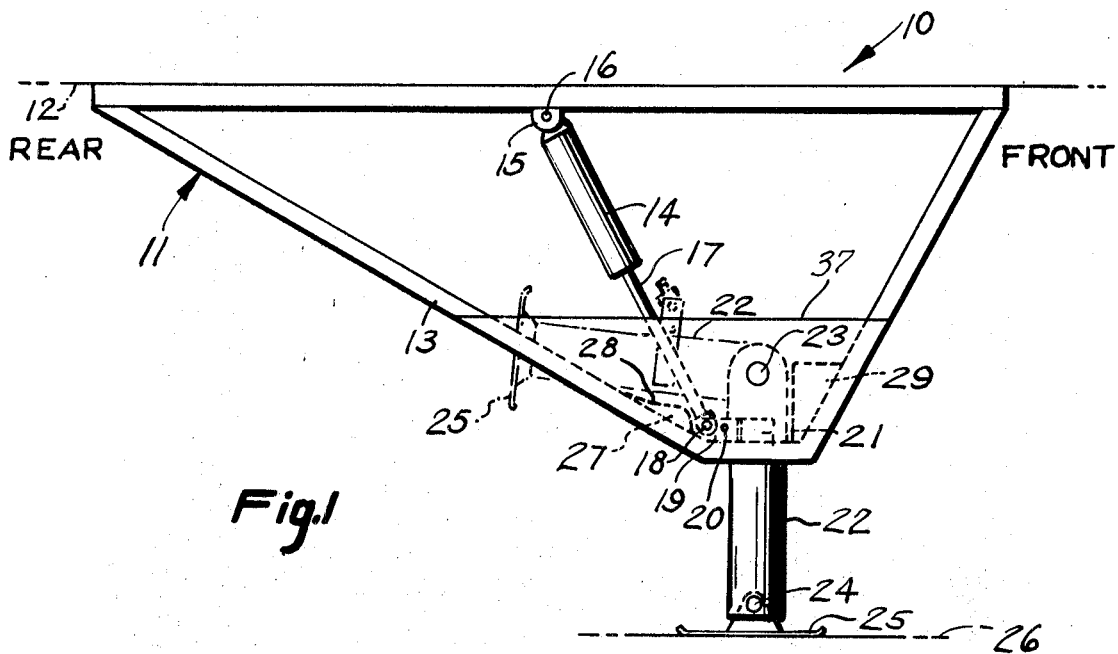
FIG. 1 is a side view of the present invention showing the upward posiiton of the legs.

According to this invention, a pneumatic trailer stand 10 is provided with a dolly chassis 11 composed of a pair of spaced apart frames 13. Dolly chassis 11 is secured in the well know manner to the bottom of the trailer chassis 12. The frames 13 of chassis 11 provide support means for all of the mechanical elements, such as the air cylinder 14 which is secured to a hinge mount carrying a pivot pin 16. Hinge mount 15 is secured within the dolly chassis 11 at its upper extremity. Within the air cylinder 14 is a piston rod 17 which is secured by a pivot pin 18 to a locking block 19. Locking block 19 is secured by pivot pin 20 to a stationary block 21 welded to the leg 22 and leg 22 is secured by leg pivots 23. The lower extremity of leg 22 is provided with a transverse pivot pin 24 securing the ground pad 25 to leg 22. Ground pad 25 prevents the trailer (not shown) from sinking into the ground 26. A counterblock 27 is secured within the lower portion of frame 13 by welding and is provided with a cammed surface 28 against which the locking block 19 slides during the operation of pneumatic trailer stand 10

In operation, the control valve 30 being connected to reservoir line 33 of the trailer (not shown) allows air under pressure into line 31 in order that piston rod 17 may extend in order to lower legs 22 of stand 10. The line 32 of control valve 30 provides a means for air to retract the piston rod 17 in order to retract the legs 22 of stand 10.

It shall be noted that the block 29 welded into frames 13 prevents over-travel of legs 22 forwardly of the trailer. Rearward the travel of legs 22 is prevented by the locking block 19 which when the legs 22 are in full lowered position will abut with the end of counter-block 27.

The counter block 27 is also provided with a foot 34 forming a pocket which prevents the over-travel of locking block 19 during the lowering of the legs 22.

It shall further be noted that when the legs 22 are in their full vertical position with the ground pads 25 upon the ground 26, air under pressure is no longer required within the cylinder 14. When the piston rod 17 of air cylinder is activated by air under pressure, from the reservoir of the trailer, the locking block is guided along the cammed surface 28 of counter block 27 until the legs 22 become vertical in position. The locking block 19 then falls within the frames 13 of dolly chassis 11 and cannot pivot backwards because of the locking block 19 being in abutment with the end of counter block 27. Upon raising the piston rod 17 within the air cylinder 14, the locking block 19 pivots upon the pivot pin 20 of stationary block 21 and is thus lifted out of engagement with counter block 27 and the legs will rise in an arcuate manner up between the frames 13.

As is well known in the art, the legs 22 must be lowered by means of the air cylinder 14 prior to unhitching the tractor from the trailer.

Figure 2:
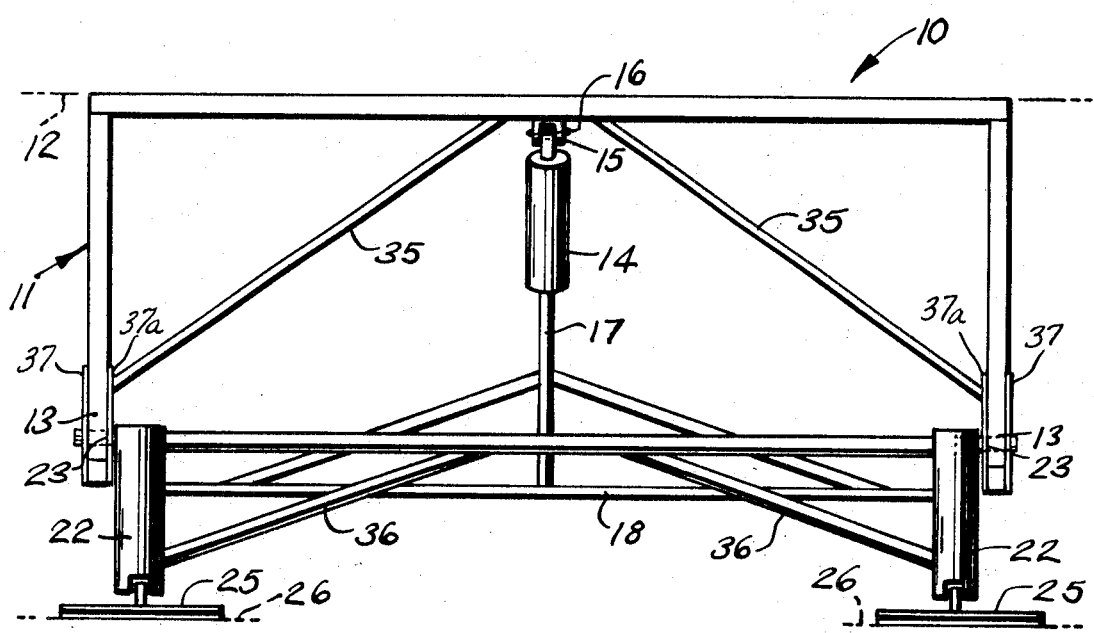
FIG. 2 is a front view of FIG. 1.
Figure 3:
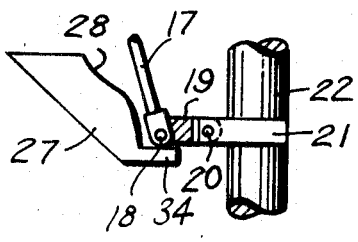
FIG. 3 is a fragmentary view of the automatic safety lock of the invention shown removed from FIG. 1.
Figure 4:
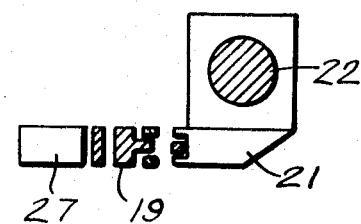
FIG. 4 is a fragmentary top plan view of FIG. 3.
Figure 5:
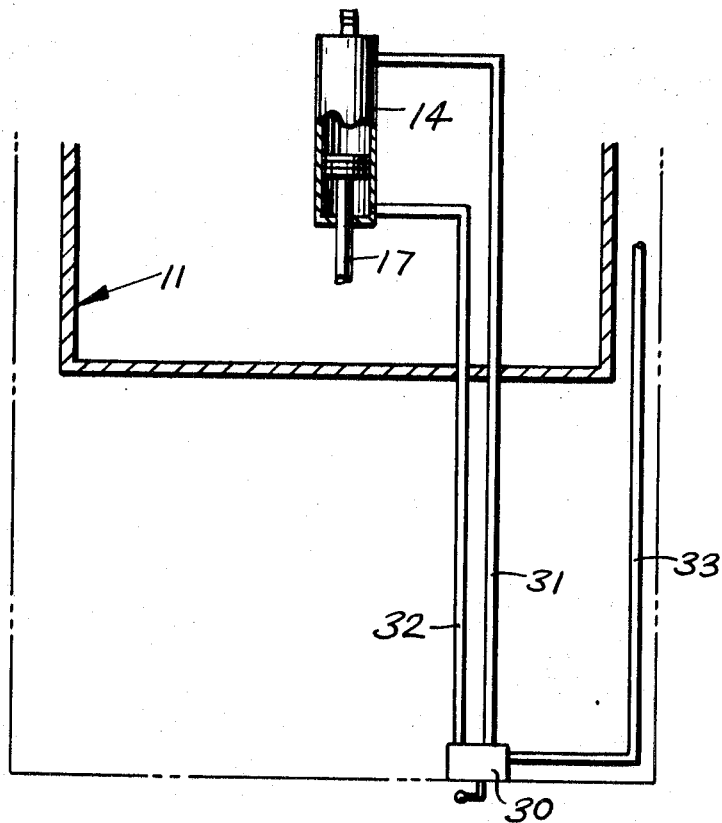
FIG. 5 is a diagrammatic view of the air line circuit of the invention.

Looking now particularly at FIGS. 1 and 2 of the drawing, one will see that pneumatic trailer stand 10 is provided with brace rods 35 for structural rigidity. A pair of angular brace rods also connect legs 22 to the pivot 23 to insure maximum strength and rigidity. Two plates 37 and 37a are provided at each side of the frame 13, to which the pivot pin 23 is attached.

While various changes may be made in the detailed construction, it is understood that such changes will be within the spirit and scope of the present invention.

I claim:
1. A pneumatically operated stand for tractor driven trailers comprising a dolly chassis, attached to the front end of said trailer, consisting primarily of two spaced frames each supporting a pivotally attached leg; a pair of rigid legs, each attached pivotally at its upper end to the said frames, and each of said legs having pivotally attached to the bottom end thereof a flat ground pad; an air cylinder pivotally attached at its upper end to the top of the chassis, and its piston rod being pivotally attached to a self-locking device which is in turn attached to the said legs, said air cylinder providing the power for raising and lowering the said legs; a self-locking device for holding the legs in the down position comprising a stationary block rigidly attached to each leg just below its pivot point, a locking block pivotally attached to each said stationary blocks, a pivot pin joining both locking blocks, said pivot pin being pivotally attached to the end of the piston rod, and a counter-block with a cam surface which terminates into a pocket, said block being located so that during the downward travel of the said legs the end of the piston rod with its attachment to the pivot pin is guided along the said cam surface and is held within the said pocket; in combination with a block rigidly attached to the said frames in front of the said legs to prevent forward overtravel of the said legs.

2. A pneumatically operated stand for a trailer such as described in claim 1, in combination with an air control valve, a compressed air reservoir, and interconnecting air lines.

References Cited

UNITED STATES PATENTS

| | | | |
|---|---|---|---|
| 2,526,905 | 10/1950 | Sartin | 280—150.5 |
| 3,075,790 | 1/1963 | Hansen | 280—475 |
| 3,169,012 | 2/1965 | Fagan | 280—427 |

BANJAMIN HERSH, Primary Examiner

R. R. SONG, Assistant Examiner